United States Patent [19]
Elliott

[11] 3,910,163
[45] Oct. 7, 1975

[54] PNEUMATIC ACTUATOR FOR TAPE REEL HUB

[75] Inventor: Robert Ralph Elliott, Santa Ana, Calif.

[73] Assignee: Century Data Systems, Inc., Anaheim, Calif.

[22] Filed: Apr. 24, 1972

[21] Appl. No.: 246,756

[52] U.S. Cl. .......... 92/92; 92/34
[51] Int. Cl.$^2$ .......... F01B 19/00; F16J 3/00
[58] Field of Search .......... 92/92, 34

[56] References Cited

UNITED STATES PATENTS

| | | | |
|---|---|---|---|
| 2,629,227 | 2/1953 | Wolfe | 92/92 X |
| 2,837,017 | 6/1958 | Hough | 92/92 X |
| 2,940,572 | 6/1960 | Warman, Jr. | 92/92 X |
| 2,973,748 | 3/1961 | Leland et al. | 92/92 X |
| 2,981,234 | 4/1961 | Appleton | 92/92 X |
| 3,162,142 | 12/1964 | Wiggermann | 91/500 X |

*Primary Examiner*—Martin P. Schwadron
*Assistant Examiner*—Abraham Hershkovitz
*Attorney, Agent, or Firm*—Bruce D. Jimerson

[57] ABSTRACT

Automatic latch actuation of a Tape Transport Supply Reel Hub facilitates operator tape loading time. A pneumatic arrangement whose output is coupled to a push/pull type tape reel hub latch through a hollow tape reel motor shaft can be used to provide in excess of 100 lbs. of force with less than 3 PSI air pressure.

2 Claims, 1 Drawing Figure

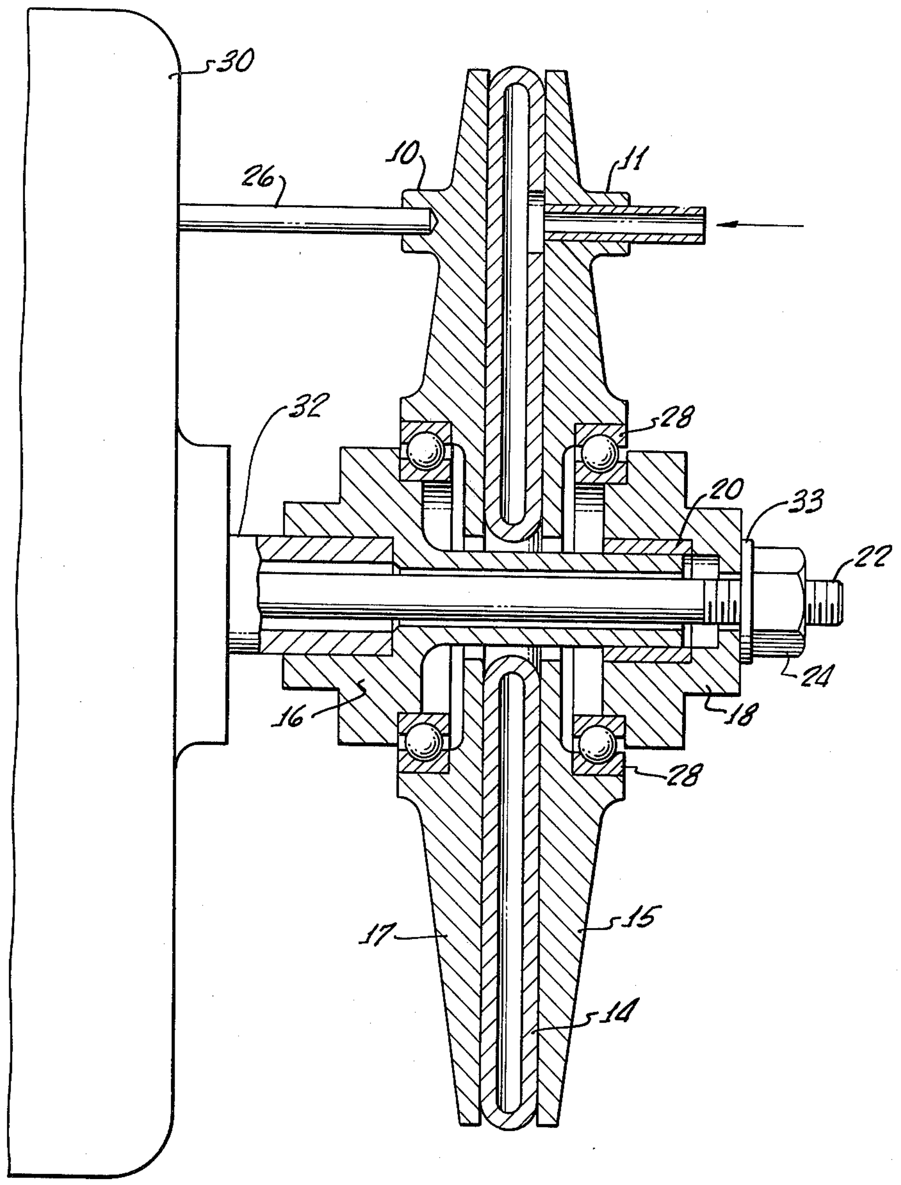
30
26
10
11
32
28
20
33
22
24
16
18
28
17
15
14

PNEUMATIC ACTUATOR FOR TAPE REEL HUB

BACKGROUND OF THE INVENTION

This invention deals with the mechanism that provides the force to latch a tape transport reel hub of a type that requires a push and/or pull action to perform the latching or locking action against the inner diameter of a tape reel. Reference is made to Patent Application Ser. No. 297,608 which shows and describes such a mechanism. The actual problem posed was that of providing a force of approximately 100 lbs. to an existing hand latch hub with a maximum available air pressure of 3 PSI. An additional requirement is that the device must also be capable of being attached to existing reel motors without modifications and also permit free rotation of the hub without additional drag or load on the motor. In addition, it must be capable of maintaining a high force without variations for sustained periods. A further requirement is that the device be designed such that it could be rapidly actuated and deactuated.

Accordingly, a primary object of the present invention is to provide a pneumatic latching for a Tape Transport Supply Reel.

A further object of the invention is to provide a latching arrangement which can be used in combination with existing reel motors.

Another object of the invention is to provide a high non-varying latching force for sustained periods.

Another object of the present invention is to provide an automatic latch which can be actuated and deactuated within specified time limits.

Other objects and advantages of the present invention will be obvious from the detailed description of a preferred embodiment given herein below.

SUMMARY OF THE INVENTION

The aforementioned objects are realized by the present invention which comprises a pair of parallel plates joined by a bladder. One of the plates is attached to a hub latching mechanism via a hollow shaft which extends through the reel motor. When the air pressure in the bladder is increased, the plates move apart applying force to the latching mechanism.

DESCRIPTION OF THE DRAWING

The drawing shows a cross-sectional view of the operating elements which comprise the invention.

DESCRIPTION OF A PREFERRED EMBODIMENT

Adverting to the drawing, a preferred embodiment of the invention comprises a pair of pressure plates 15 and 17 and 10 and 11, a bladder 14, a fixed pressure plate bearing holder 16, a moving pressure plate bearing holder 18, a guide bearing 20, an actuator draw rod 22, a locking pin 26 and bearings 28. The function of the complete assembly is to inflate upon receipt of air pressure and apply a force on the actuator draw rod 22 that in turn performs the locking function on the hub device located on the other end of the motor shaft (not shown). The pull force on the draw rod 22 is related directly to the area of the bladder surface against the two pressure plates and the total pressure of the air source. These factors can be varied to produce the force necessary to actuate a wide variety of locking hub designs. It will be noted that the assembly is mounted on a hollow shaft 32 extending from the rear of the reel motor 30. The fixed pressure plate bearing holder 16 will rotate with the motor shaft. The fixed pressure plate 17 will be retained from rotation by means of a locking pin 26. The moving pressure plate 15 is held from rotating through bladder 14 but is capable of lateral motion, sliding on the guide bearing 20. The guide bearing is attached to the actuator draw rod 22 by means of a washer 33 and a locking nut 24.

The advantages of this device is that it can provide almost unlimited force to latch the hub mechanism permitting the basic hand latched device (with minor modifications) to be used. Prior art devices require a special hub latching mechanism located within the tape reel hub, designed to operate with a total force approximately 12 to 15 lbs. Furthermore, this device is a closed system and is not subjected to wear of any sliding or rotating seals.

The basic concept of the invention is not limited to tape reels, or latching mechanisms in general. The teachings of the invention may be applied to any system wherein it is required to augment the mechanical force required to perform specific tasks. Thus, although a preferred embodiment has been shown and illustrated, it will be understood that the invention is not limited thereto, and that numerous changes, modifications, and substitutions may be made without departing from the spirit of the invention.

I claim:

1. In a tape transport having a reel motor located on one side of a partition and a latching mechanism for engaging a tape reel on the other side of the partition wherein the improvement comprises:

a hollow reel motor shaft;

means for mounting the reel motor so that said hollow shaft is perpendicular to the plane of the partition;

a second shaft inside said hollow reel motor shaft;

pneumatic means for moving said second shaft parallel to the axis of said reel motor shaft.

2. The apparatus recited in claim 1 wherein said pneumatic means comprises;

a pair of parallel plates joined by a bladder;

means for attaching one of said plates to the reel motor;

means for transmitting the movement of the other of said plates to said second shaft.

* * * * *